(12) United States Patent
Iwano et al.

(10) Patent No.: US 12,473,019 B2
(45) Date of Patent: Nov. 18, 2025

(54) VEHICLE CONTROL DEVICE

(71) Applicant: HONDA MOTOR CO., LTD., Tokyo (JP)

(72) Inventors: Ko Iwano, Tokyo (JP); Kyoji Hamamoto, Tokyo (JP); Masaya Kusatani, Tokyo (JP); Yuki Mano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 385 days.

(21) Appl. No.: 18/188,588

(22) Filed: Mar. 23, 2023

(65) Prior Publication Data

US 2023/0311978 A1  Oct. 5, 2023

(30) Foreign Application Priority Data

Dec. 23, 2022  (JP) .................................. 2022-206659

(51) Int. Cl.
*B62D 5/04* (2006.01)
(52) U.S. Cl.
CPC .................................. *B62D 5/0484* (2013.01)
(58) Field of Classification Search
CPC .. B62D 5/0481; B62D 5/0484; F01N 11/0825
See application file for complete search history.

(56) References Cited

U.S. PATENT DOCUMENTS 5,982,137 A * 11/1999 Endo ..................... B62D 5/0466
318/812
2009/0298644 A1   12/2009 Nihei et al.
2013/0197757 A1 *  8/2013 Ellis ....................... B62D 6/007
701/41

(Continued)

FOREIGN PATENT DOCUMENTS

CN          101598214 A     12/2009
CN          102700395 A     10/2012

(Continued)

OTHER PUBLICATIONS

Chinese Office Action received in corresponding Chinese application No. 202310268459.9 dated Sep. 28, 2025 with English translation (11 pages).

*Primary Examiner* — Long T Tran
(74) *Attorney, Agent, or Firm* — Rankin, Hill & Clark LLP

(57) ABSTRACT

A vehicle control device includes: an idle-stop controller configured to control an idle-stop function of a vehicle; and an electric power steering controller configured to assist a steering operation with an electric motor. The electric power steering controller is configured such that, when the electric power steering controller detects a failure by diagnosis, the electric power steering controller controls, based on whether vehicle speed related information including vehicle wheel speed information is receivable and based on whether idle-stop related information related to an idle-stop operation is receivable, an assist operation assisting a steering effort while the idle-stop operation is in progress so that the idle-stop operation may be performed. The idle-stop controller is configured to control the idle-stop function of the vehicle even when the electric power steering controller detects the failure by the diagnosis.

5 Claims, 3 Drawing Sheets

(56) References Cited

U.S. PATENT DOCUMENTS

| | | | |
|---|---|---|---|
| 2015/0275840 A1 | 10/2015 | Sawada | |
| 2016/0052541 A1* | 2/2016 | Nakayama | B62D 5/0481 |
| | | | 701/41 |
| 2016/0229450 A1* | 8/2016 | Basting | B62D 5/0472 |
| 2018/0148088 A1* | 5/2018 | Katayama | B62D 5/0484 |
| 2019/0241189 A1* | 8/2019 | Odate | B60W 50/04 |
| 2020/0062225 A1 | 2/2020 | Kobori et al. | |

FOREIGN PATENT DOCUMENTS

| | | |
|---|---|---|
| CN | 104943690 A | 9/2015 |
| CN | 106004995 A | 10/2016 |
| CN | 110884491 A | 3/2020 |
| CN | 113415339 A | 9/2021 |
| JP | 2004-276664 A | 10/2004 |
| JP | 2010-120447 A | 6/2010 |
| JP | 2015-047879 A | 3/2015 |
| KR | 10-2005-0122314 A | 12/2005 |
| WO | 2019/190524 A1 | 10/2019 |

\* cited by examiner

VEHICLE CONTROL DEVICE

CROSS REFERENCE TO RELATED APPLICATIONS

The present application claims the foreign priority benefit under Title 35 U.S.C. § 119 of Japanese Patent Application No. 2022-206659, filed on Dec. 23, 2022, which claims priority to Japanese Patent Application No. 2022-060908, filed on Mar. 31, 2022, the entire disclosures of which are hereby incorporated herein by reference.

BACKGROUND OF THE INVENTION

1. Field of the Invention

The present invention relates to a vehicle control device that controls an electric power steering mechanism and idle-stop operations.

2. Description of Related Art

In order to reduce adverse effects on the global environment, automobile exhaust gas regulations are becoming more advanced. In this background, many automobiles are equipped with an idle-stop function of stopping the engine immediately before the automobile stops or while the automobile is in a state where the automobile has stopped. This feature also improves the fuel economy and reduces the idling noises.

In general, an electric power steering controller (hereinafter referred to as "EPS controller") is configured such that, when the engine is being restarted from an idle-stop state, a diagnosis function of the EPS controller uses a low threshold value in determining a voltage error in consideration of cases where a battery voltage drop occurs due to large electric power being supplied to a starter motor during a cranking operation.

When communication between an idle-stop controller (hereinafter referred to as IS controller) of the vehicle control device and the EPS controller is interrupted, the EPS controller is unable to know the idle-stop state. For this reason, the EPS controller is sometimes configured to perform determination of voltage error due to cranking, by means of a diagnosis function. There is known a technique to avoid that voltage error such that when communication between an IS controller and an EPS controller is interrupted, the EPS controller outputs an electric signal for forbidding idle-stop operations to the IS controller, to forbid idle-stop operations (see Japanese Patent Publication No. 2015-047879).

The above-described technique suffers from the degradation of the emission of the vehicle due to forbidding performing idle-stop operations.

In view of the above-described problems, it is an object of the present invention is to provide a vehicle control device capable of reducing degradation of emission of a vehicle.

SUMMARY OF THE INVENTION

Provided by an embodiment according to the present invention is a vehicle control device including: an idle-stop controller configured to control an idle-stop function of a vehicle; and an electric power steering controller configured to assist a steering operation with an electric motor, wherein the electric power steering controller is configured such that, when the electric power steering controller detects a failure by diagnosis, the electric power steering controller controls, based on whether vehicle speed related information including vehicle wheel speed information is receivable and based on whether idle-stop related information related to an idle-stop operation is receivable, an assist operation assisting a steering effort while the idle-stop operation is in progress so that the idle-stop operation may be performed, and wherein the idle-stop controller is configured to control the idle-stop function of the vehicle even when the electric power steering controller detects the failure by the diagnosis.

With a vehicle control device according to the present invention, the electric power steering controller performs control so that idle-stop operations may be performed even when the electric power steering controller detects a failure by diagnosis, which, as a result, reduces the degradation of the emission of the vehicle.

DETAILED DESCRIPTION OF EMBODIMENT

Hereinafter, a description is given of a vehicle control device of an embodiment.

Figure 1:
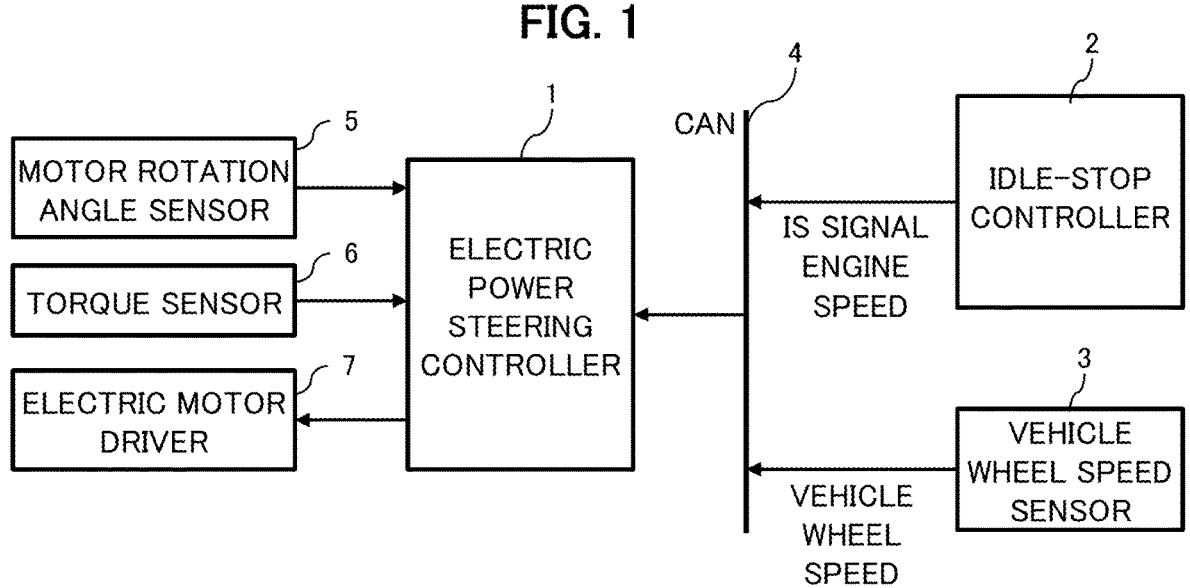
FIG. 1 is a diagram of a system configuration of a vehicle control device of an embodiment.

FIG. 1 is a diagram of a configuration concerning the electric power steering mechanism and the idle-stop function of a vehicle control device of an embodiment.

The vehicle control device of the embodiment includes: an EPS controller 1 configured to control the electric power steering mechanism, which assists the steering effort necessary for handle operations with an electric motor; and an IS controller 2 that controls the idle-stop function of automatically stopping the engine when the vehicle has stopped and automatically restarting the engine when the vehicle attempts to start.

The EPS controller 1 controls an electric motor driver 7 based on: a steering wheel torque detected by a torque sensor 6 that detects the steering wheel torque generated by a steering handle operation; and a motor rotation angle detected by a motor rotation angle sensor 5 such as resolvers and MR sensors that detect the rotation angle of the electric motor, to assist the steering effort thereby to assist the handle operation.

The EPS controller 1 establishes, via Control Area Network (CAN) 4, a connection to the IS controller 2 and to a vehicle wheel speed sensor 3 that detects the rotation speed of a vehicle wheel.

The EPS controller 1 obtains, via CAN 4, information on the vehicle wheel speed detected by the vehicle wheel speed sensor 3. The EPS controller 1 obtains, from the IS controller 2 via CAN 4, an IS signal indicative of whether an idle-stop operation is in progress and information on the engine speed, to assist the handle operation.

When a steering wheel torque and/or a steering angle speed, each equal to or greater than a predetermined value, is being detected, the EPS controller 1 prohibits the IS controller 2 from performing an idle-stop operation. In other words, the idle-stop operation by the IS controller 2 is performed when the steering wheel torque and the steering angle speed are each less than the predetermined value.

Note that, in this specification, information on vehicle speed, such as vehicle wheel speed, is sometimes called vehicle speed related information, and information on the idle-stop operations on the engine, such as the IS signal and engine speed, is sometimes called idle-stop related information.

Note that FIG. 1 depicts that the IS controller 2 notifies of the information on the engine speed. However, alternatively, a not-shown engine controller of a vehicle control device may perform the notification.

Specifically, the EPS controller 1 and the IS controller 2 are each an Electronic Control Unit (ECU) including a Central Processing Unit (CPU), a Read Only Memory (ROM), a Random Access Memory (RAM), electronic components, and interface circuitry and are each configured to embody a respective function by executing a program stored in the ROM.

The EPS controller 1 and the IS controller 2 may be constructed as separate ECUs and may be constructed unitarily in one ECU.

The EPS controller 1 has a diagnosis function that monitors malfunctions such as communication errors and sensor malfunctions, in order to exercise the function of assisting the steering effort. The EPS controller 1 performs, based on the detected malfunctions, alternative control so as to degenerate the function.

Figure 2:
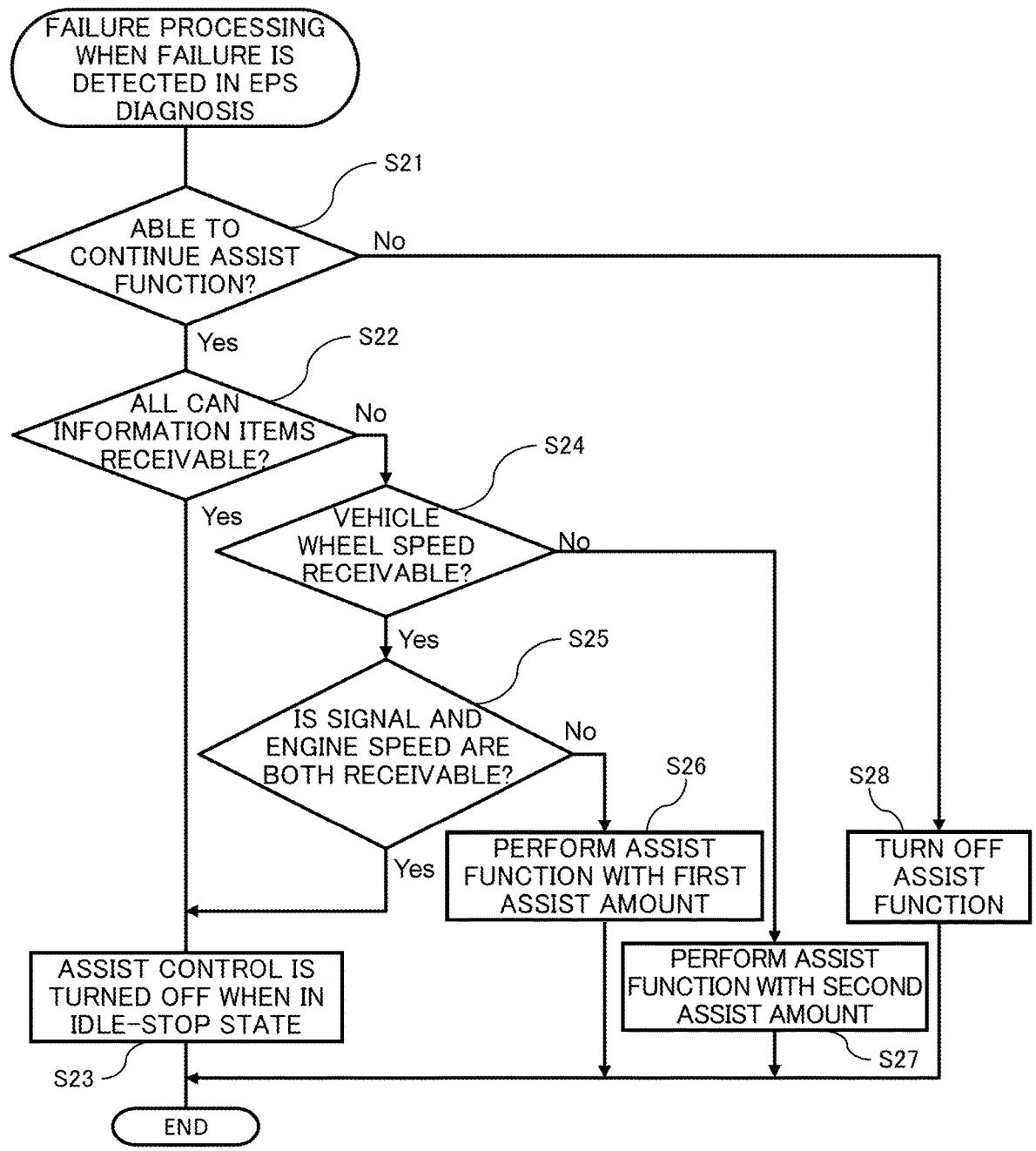
FIG. 2 is a flowchart of operations to be performed by an EPS controller 1 when a failure is detected by a diagnosis function.

FIG. 2 is a flowchart of setting operations of the alternative control to be performed by the EPS controller 1 when a failure is detected by diagnosis.

In step S21, the EPS controller 1 determines, based on the failure detected by diagnosis, whether it is possible to continue the normal control of assisting a steering effort in an idle-stop state. If continuation is possible (Yes at S21), the flow proceeds to step S22, and if continuation is not possible (No at S21), the flow proceeds to step S28.

In step S22, the EPS controller 1 determines whether all CAN information items are receivable through CAN 4. If receivable (Yes at S22), the flow proceeds to step S23, and if not receivable (No at S22), the flow proceeds to step S24.

In Step S23, the EPS controller 1 sets the control state of the EPS controller 1 so as to perform normal operations in response to idle-stop related signals of the vehicle in the same manner as when no failure is detected by the diagnosis (in the same manner as in a normal state), so that assist control is turned off when an idle-stop operation is in progress. An example of operations of the IS controller 2 and the EPS controller 1 in this case is described later with reference to FIG. 3.

In step S24, the EPS controller 1 determines whether information on the vehicle wheel speed is receivable via CAN 4. If receivable (Yes at S24), the flow proceeds to step S25, and if not receivable (No at S24), the flow proceeds to step S27. In step S24, the EPS controller 1 diagnoses whether it is possible to detect a stop state of the vehicle.

In step S25, the EPS controller 1 determines whether information on the IS signals and information on the engine speed are both receivable via CAN 4. If receivable (Yes at S25), the flow proceeds to step S23, and if not receivable (No at S25), the flow proceeds to step S26. In step S25, the EPS controller 1 diagnoses whether it is possible to detect an idle-stop state of the engine.

Specifically, when information on the vehicle wheel speed indicates a speed of 0 and information on the IS signal and the engine speed indicates that the engine is in an idle state, the EPS controller 1 sets the control state of the EPS controller 1 so as to turn off the assist control while an idle-stop operation is in progress, so that, in response to idle-stop related signals of the vehicle, the EPS controller 1 prohibits steering assist operations in the same manner as when no failure is detected by the diagnosis (in the same manner as in a normal state).

With this, even when the EPS controller 1 detects a failure due to a communication error and the like as a result of the diagnosis, as the EPS controller 1 is able to detect that the engine is in an idle state, there is no need of prohibiting an idle-stop operation of the engine. Therefore, degradation of the emission of the vehicle is reduced.

In another viewpoint, as the EPS controller 1 is able to detect that the engine is in an idle state based on plural conditions including the IS signal information and the engine speed information, the redundancy of the steering assist control by the EPS controller 1 is improved.

In step S26, the EPS controller 1 determines whether the vehicle is traveling or has stopped, based on CAN information on the vehicle wheel speed, based on which the travel state of the vehicle is known. When the EPS controller 1 has determined that the vehicle is traveling, the EPS controller 1 performs normal operations of assisting the steering effort. When the EPS controller 1 has determined that the vehicle has stopped, the EPS controller 1 estimates that the vehicle is being in an idle-stop state and sets the control state of the EPS controller 1 to a state of alternative control so as to adjust the assist output to a first assist amount which is less than a normal amount. An example of operations of the IS controller 2 and the EPS controller 1 in this case is described later with reference to FIG. 4.

Specifically, when the EPS controller 1 determines that the vehicle is traveling, based on the CAN information on the vehicle wheel speed, based on which the travel state of the vehicle is known, the EPS controller 1 estimates that the engine is rotating at a rotation speed faster than or equal to the rotation speed of idling and performs normal operations of assisting the steering effort; and When the EPS controller 1 determines that the vehicle has stopped, the EPS controller 1 estimates that the vehicle is being in an idle-stop state and sets the control state of the EPS controller 1 to a state of alternative control so as to adjust the assist output to a first assist amount which is less than a normal amount. Alternatively, when the EPS controller 1 determines that the vehicle has stopped, the EPS controller 1 may set the control state of the EPS controller 1 to a state of alternative control so as not to perform operations of assisting the steering effort.

An example of the above-described first assist amount is zero. The first assist amount is to be less than the amount of assisting the steering effort when the engine is in operation and no failure is detected by the diagnosis, and thus may be a value lager than zero, for example.

Moreover, the first assist amount may be equivalent to the below-described second assist amount.

With this, even when the EPS controller 1 is unable to receive the IS signal or the engine speed, the EPS controller 1 adjusts the assist amount of assisting the steering effort based on the CAN information on the vehicle wheel speed, which makes it possible to perform a steering assist operation properly without prohibiting an idle-stop operation and thus improve the redundancy.

In step S27, as the EPS controller 1 is unable to know the travel state of the vehicle, the EPS controller 1 sets the control state of the EPS controller 1 to a state of alternative control so as to adjust the assist output to a second assist amount which is less than the normal amount, to the extent where there is no influence from the voltage drop due to cranking. An example of operations of the IS controller 2 and the EPS controller 1 in this case is described later with reference to FIG. 5.

Specifically, the EPS controller 1 adjusts the second assist amount within a range from a lower limit to an upper limit such that an assist operation with an assist amount of the lower limit does not influence the steering availability in an emergency situation and that a voltage drop due to an assist operation with an assist amount of the upper limit is within a range where torque variation occurring during a cranking operation in restarting the engine in an idle-stop state is allowable.

In other words, the EPS controller 1 sets the second assist amount within a range from about 20 percent to about 40 percent with respect to the maximum output in the normal state.

The second assist amount may be adjusted in consideration of an emergency avoidance action in response to an obstacle and/or of a vehicle self-propelled travel amount necessary in the event of a failure of the vehicle (a self-propelled travel amount necessary for visiting an auto repair shop).

Conventionally, no idle-stop operation is performed when EPS is malfunctioning, in consideration that steering handle operations will be performed. According to this embodiment, however, EPS is controlled such that an idle-stop operation is continued even when a steering handle operation is performed.

With this, the EPS controller 1 performs control so that an idle-stop operation is performed even when the travel state of the vehicle is unknown, which makes it possible to reduce degradation of the emission of the vehicle without prohibiting idle-stop operations and to cope with an emergency control or the like by performing a steering assist operation by the electric power steering mechanism, thereby to improve the redundancy.

In step S28, the EPS controller 1 sets the control state of the EPS controller 1 to a state of alternative control so as to turn off (so as not to perform) the steering assist function with the electric power steering mechanism. In addition, the EPS controller 1 displays a warning message regarding the failure on a not-shown console of the vehicle.

With this, even when no steering assist operation can be performed by the EPS controller 1, as the IS controller 2 performs idle-stop control when the vehicle satisfies a predetermined condition, degradation of the emission of the vehicle is reduced.

Subsequently, with reference to FIGS. 3 to 5, descriptions will be given of examples of operations of the IS controller 2 and the EPS controller 1 in the cases where the control state of the EPS controller 1 is set to a state of alternative control in steps S23, S26, and S27 in FIG. 2.

Figure 3:
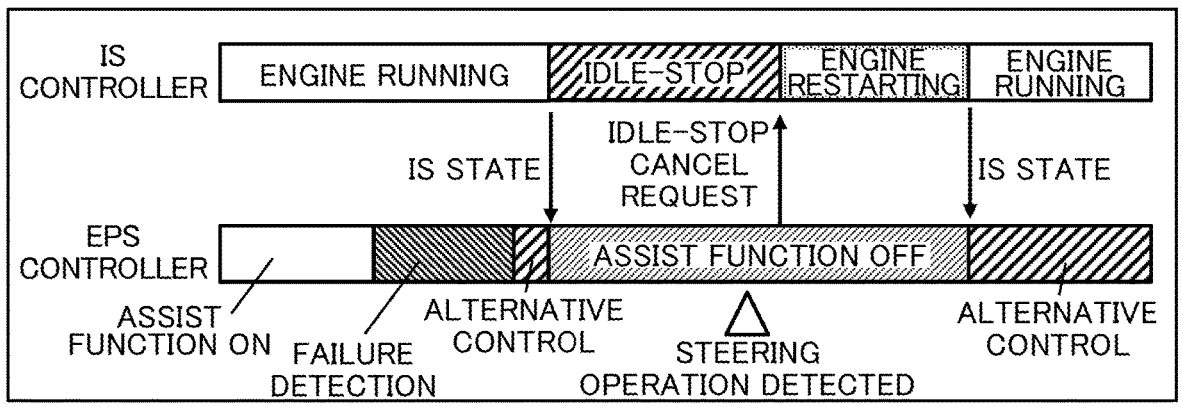
FIG. 3 is a diagram illustrating an example of operations of an IS controller 2 and the EPS controller 1 in step S23 in FIG. 2.

FIG. 3 illustrates operations of the EPS controller 1 in step S23 (see FIG. 2). In this case, the IS controller 2 and the EPS controller 1 operate in the same manner as in the normal state, in which no failure is detected by the diagnosis by the EPS controller 1. Specifically, the EPS controller 1 performs operations of assisting the steering effort in the same manner as when performing operations of assisting the steering effort in a state where the engine is in operation and no failure is detected by the diagnosis. That is, the EPS controller 1 turns off the assist function when an idle-stop operation is in progress.

When the EPS controller 1 detects, by receiving an IS signal and a signal indicative of the engine speed (by receiving a signal representing an IS state) via CAN 4, that the IS controller 2 has caused the engine to be idle-stopped, the EPS controller 1 turns off (does not perform) the steering assist function using the electric power steering mechanism, to cope with the battery voltage drop occurring during a cranking operation in restarting the engine.

Then, when the EPS controller 1 detects a steering handle operation, the EPS controller 1 notifies the IS controller 2 of an idle resume request via CAN 4.

The IS controller 2 restarts the engine in response to this request.

When the EPS controller 1 detects completion of restarting the engine by the IS controller 2 based on receipt of a signal representing an IS state, the EPS controller 1 restores the assist function.

Figure 4:
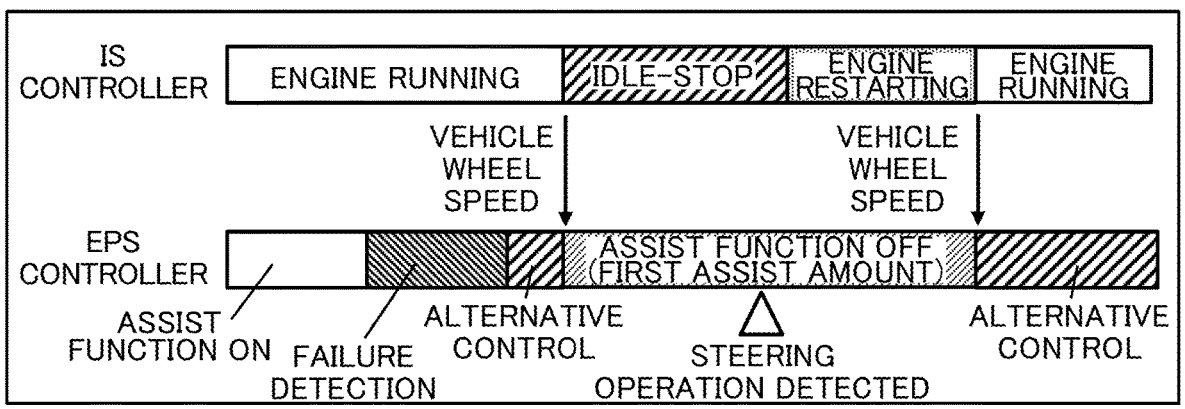
FIG. 4 is a diagram illustrating an example of operations of the IS controller 2 and the EPS controller 1 in step S26 in FIG. 2.

FIG. 4 illustrates operations of the alternative control set in step S26 (see FIG. 2). In this case, the EPS controller 1 determines whether the vehicle is traveling or has stopped, based on the CAN information on the vehicle wheel speed, based on which the travel state of the vehicle is known. When the EPS controller 1 has determined that the vehicle is traveling, the EPS controller 1 performs normal operations of assisting the steering effort. When the EPS controller 1 has determined that the vehicle has stopped, the EPS controller 1 estimates that the vehicle is being in an idle-stop state and adjusts the assist output to a first assist amount, which is less than a normal assist amount, in case for the voltage dropping due to a cranking operation.

In more detail, when the EPS controller 1 detects that the vehicle wheel speed is 0, the EPS controller 1 estimates that the vehicle has been idle-stopped and performs, as alternative control, no steering assist operation (turns off the assist function) to cope with the battery voltage drop that occurs during a cranking operation in restarting the engine.

The EPS controller 1 determines, based on the CAN information on the vehicle wheel speed, that the engine has restarted, and sets the assist output to an amount larger than the first assist amount.

Figure 5:
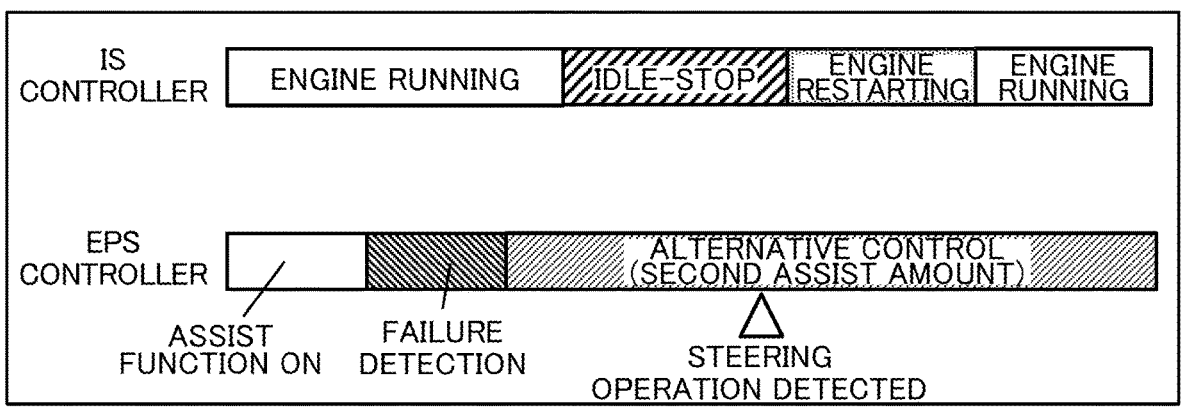
FIG. 5 is a diagram illustrating an example of operations of the IS controller 2 and the EPS controller 1 in step S27 in FIG. 2.

FIG. 5 illustrates operations of the alternative control set in step S27 (see FIG. 2). In this case, as the EPS controller 1 is unable to know the travel state of the vehicle and the idle state of the engine, the EPS controller 1 adjusts the assist output to a second assist amount which is less than the normal amount to the extent where there is no influence caused by the voltage drop due to cranking.

The second assist amount is set within a range whose lower limit is an assist amount that does not influence the steering availability and whose upper limit is an assist amount with which the assist torque variation possibly occurring during a cranking operation in restarting the engine in an idle-stop state is allowable.

As the EPS controller 1 performs alternative control based on the diagnosis so as to assist the steering operation with the second assist amount (performs control so that an idle-stop operation may be performed), when the EPS controller 1 detects a steering operation in an idle-stop state produced by the IS controller 2, the EPS controller 1 assists the steering effort with the second assist amount.

As described, when a failure is detected by the diagnosis performed by the EPS controller 1, the vehicle control device of the embodiment alters the control of the EPS controller 1 based on whether information on the vehicle wheel speed is receivable via CAN 4 and whether the IS signal and information on the engine speed are receivable via CAN 4, thereby to prevent the IS controller 2 from prohibiting an idle-stop operation and thus reduce the degradation of the emission of the vehicle.

I should be noted that the present invention is not limited to the above-described embodiment and various changes in design can be made without departing from the gist of the invention.

What is claimed is:

1. A vehicle control device comprising:
an idle-stop controller configured to control an idle-stop function of a vehicle; and
an electric power steering controller configured to assist a steering operation with an electric motor,
wherein the electric power steering controller is configured such that, when the electric power steering controller detects a failure by diagnosis, the electric power steering controller controls, based on whether vehicle speed related information including vehicle wheel speed information is receivable and based on whether idle-stop related information related to an idle-stop operation is receivable, an assist operation assisting a steering effort while the idle-stop operation is in progress so that the idle-stop operation may be performed, and
wherein the idle-stop controller is configured to control the idle-stop function of the vehicle even when the electric power steering controller detects the failure by the diagnosis.

2. The vehicle control device according to claim 1,
wherein the electric power steering controller is further configured to,
when the electric power steering controller detects the failure by the diagnosis and the vehicle wheel speed information and the idle-stop related information are receivable,
perform the assist operation assisting the steering effort in the same manner as when performing an operation of assisting a steering effort in a state where an engine is in operation and no failure is detected by the diagnosis.

3. The vehicle control device according to claim 1,
wherein the electric power steering controller is further configured to,
when the electric power steering controller detects the failure by the diagnosis and the vehicle wheel speed information is receivable and none of the idle-stop related information is receivable,
not to perform the assist operation assisting the steering effort while the vehicle has stopped.

4. The vehicle control device according to claim 1,
wherein the electric power steering controller is further configured to,
when the electric power steering controller detects the failure by the diagnosis and the vehicle wheel speed information is not receivable,
perform the assist operation assisting the steering effort while the idle-stop operation is in progress with an assist amount within a range from a lower limit to an upper limit, the lower limit being such that an assist operation with the assist amount does not influence steering availability, the upper limit being such that a voltage drop due to the assist operation with the assist amount is within a range where torque variation occurring during a cranking operation in restarting the engine in an idle-stop state is allowable.

5. The vehicle control device according to claim 1,
wherein the electric power steering controller is further configured to,
when the electric power steering controller detects the failure by the diagnosis and the vehicle wheel speed information is not receivable,
perform the assist operation assisting the steering effort while the idle-stop operation is in progress with an assist amount less than an amount of assisting a steering effort when the engine is in operation and when no failure is detected by the diagnosis.

* * * * *